United States Patent
Ben Asher et al.

[11] Patent Number: 5,375,684
[45] Date of Patent: Dec. 27, 1994

[54] BRAKE RELEASE LOCK

[76] Inventors: Eldad Ben Asher, 48 Keren Hayesod Street, Ramat Hasharon; Yaakov Shirai, Moshav Yavniel, Lower Galilee, both of Israel

[21] Appl. No.: 67,937

[22] Filed: May 27, 1993

[30] Foreign Application Priority Data

May 27, 1992 [IL] Israel ..................... 102028

[51] Int. Cl.$^5$ .................. B60T 17/16; F16K 15/18
[52] U.S. Cl. ................... 188/353; 303/89; 251/129.11
[58] Field of Search .............. 188/353; 137/269.5, 137/599, 599.2; 251/129.11, 129.12; 303/89

[56] References Cited

U.S. PATENT DOCUMENTS

| | | | |
|---|---|---|---|
| 3,645,352 | 2/1972 | Stark et al. | 188/353 X |
| 3,653,406 | 4/1972 | Racki | 137/599.2 |
| 3,870,274 | 3/1975 | Broe | 251/129.12 |
| 3,872,953 | 3/1975 | Taylor | 188/353 |
| 4,579,202 | 4/1986 | McIntosh | 188/353 X |
| 4,793,661 | 12/1988 | Munro | 188/353 X |
| 4,881,615 | 11/1989 | Conway | 188/353 X |
| 5,259,665 | 11/1993 | Christner | 188/1.11 X |

FOREIGN PATENT DOCUMENTS 2035486  6/1980  United Kingdom ............... 188/353

Primary Examiner—Robert J. Oberleitner
Assistant Examiner—Alfred Muratori
Attorney, Agent, or Firm—Larson and Taylor

[57] ABSTRACT

A brake release lock interposable between the master cylinder of a hydraulic vehicle braking system and the wheel cylinders, including a first connecting element for connection to the master cylinder, a second connecting element for connection to the wheel cylinders, a first passageway connecting the first and second member, having a valve seat and bore for a check valve spring-biased against the seat and configured in such a way as to permit fluid to flow from the master cylinder to the wheel cylinders, but to prevent fluid from returning from the wheel cylinders to the master cylinder, a second passageway connecting the first and second connecting elements, bypassing the first passageway, and a solenoid valve responsive to signals producible by an authorized user of the vehicle, for cutting off the second passageway after the vehicle has been parked, and for re-establishing the second passageway prior to driving off the vehicle.

3 Claims, 2 Drawing Sheets

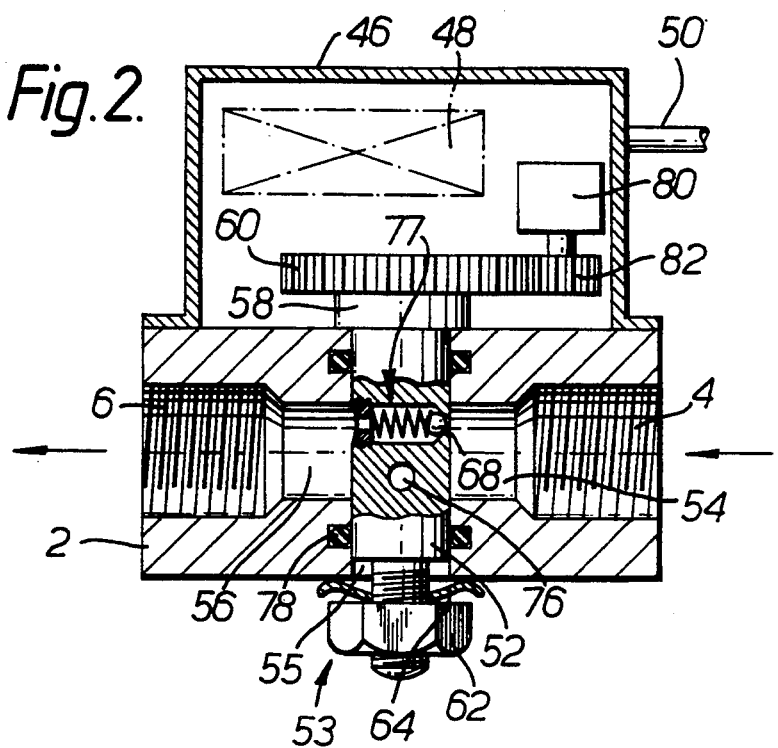
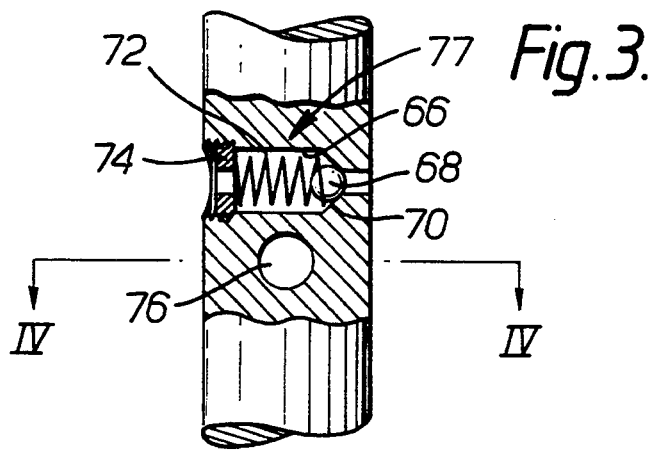
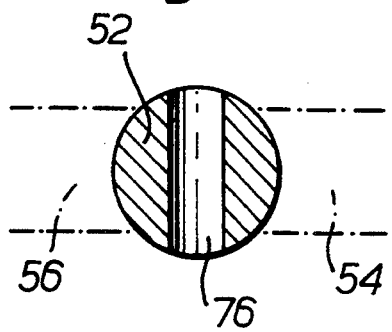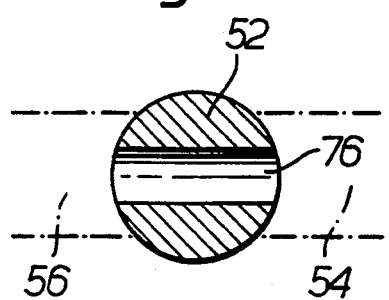

BRAKE RELEASE LOCK present invention relates to a brake release lock interposable between the master cylinder of a hydraulic vehicle braking system and the wheel cylinders.

With the ever-rising incidence of car thefts, the sophistication of anti-theft devices is seen to continually rise. Unfortunately, however, so is the sophistication of car thiefs.

It is thus one of the objectives of the present invention to overcome the inadequacies of the prior-art protective devices and to provide an anti-theft device that is practically tamper-proof, fully reliable as well as relatively inexpensive and is easily installed.

According to the invention, this is achieved by providing a brake release lock interposable between the master cylinder of a hydraulic vehicle braking system and the wheel cylinders, comprising a first connecting element for connection to said master cylinder, a second connecting element for connection to said wheel cylinders, a first passageway connecting said first and said second member, including a valve seat and bore for a check valve spring-biased against said seat and configured in such a way as to permit fluid from flowing from said master cylinder to said wheel cylinders, but preventing fluid from returning from said wheel cylinders to said master cylinder, a second passageway connecting said first and said second connecting elements, bypassing said first passageway, and means, responsive to signals producible by an authorized user of said vehicle, for cutting off said second passageway after said vehicle has been parked, and for re-establishing said second passageway prior to driving off said vehicle.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

FIG. 2 is a similar view of a second embodiment of the lock;

FIG. 3 is an enlarged view, in partial cross section, of the shaft of FIG. 2;

FIG. 4 is a view, in cross section along plane IV—IV, of the shaft of FIG. 3, and FIG. 5 is a similar view, but with the shaft in the "unlocked" position.

Figure 1:
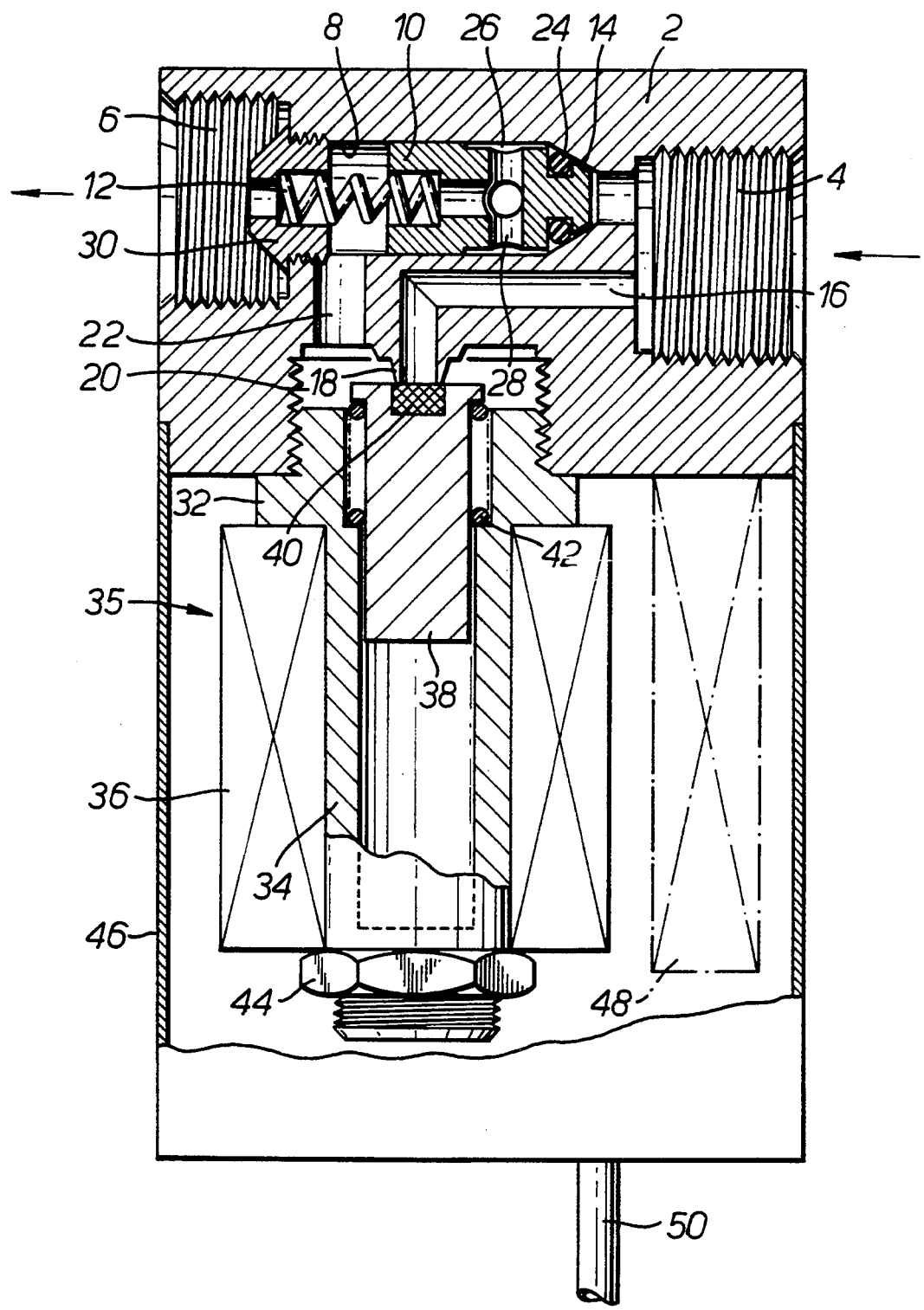
FIG. 1 is a schematic cross-sectional view of a first embodiment of the lock according to the invention, in the "locked" position.

Referring now to the drawings, there is seen in FIG. 1 a lock body 2 provided with an inlet socket 4 connectable to the master cylinder of the hydraulic braking system (not shown) and an outlet socket 6 connectable to the wheel cylinders. These two sockets communicate via a first duct including a guide bore 8 for a check valve 10 biased by a helical spring 12 against a tapering valve seat 14 and to be described in greater detail further below.

A second duct 16 leads via second valve seat 18 into a valving chamber 20 and thence, via a third duct 22 and the guide bore 8 into the outlet socket 6, as it were bypassing the check valve 10.

At its active end, the check valve 10 is provided with an O-ring type seal 24, normally pressed against the valve seat 14. For a portion of its length, its outside diameter is reduced, forming, in conjunction with the bore 8, an annular space 26 via which, in circumstances and for a purpose to be specified further below, pressurized brake fluid from the master cylinder can reach the outlet socket 6 through ducts 28 connecting the space 26 with the bore 8 behind the check valve 10. The checkvalve spring 12 abuts against a threaded retaining plug 30 screwed into the bore 8.

The valving chamber 20 is tightly closed off by the head 32 of the tubular core 34 of a normally closed solenoid valve 35, which core carries the energizing coil 36 and in which is slidably mounted the valve plunger 38. The latter carries a valve pad 40 preferably made of an elastomer and is biased against the valve seat 18 by a helical spring 42.

The coil 36 is retained on the core 34 with the aid of a nut 44. The solenoid valve is advantageously protected by a casing 46, which also accommodates an electronic control unit 48. Power to the coil 36 and the control unit 48 is supplied via leads 50.

The locking action of the device according to the invention, when active, consists in permitting brake fluid from the master cylinder to be forced into the wheel cylinders, while preventing the return of brake fluid from the wheel cylinders to the master cylinder, in other words, locking the brakes. Unlocking can only be effected by re-establishing the flow path from the wheel cylinders to the master cylinder via the duct 22, the chamber 20 and the duct 28, i.e., by opening the solenoid valve 35.

From what has been explained so far, it is already clear that as long as the vehicle is on the road, the valve 35 must stay open in order to facilitate release of the brakes when pressure is taken off the brake pedal. That means that in case of the embodiment of FIG. 1, where valve 35 is a solenoid valve, a holding current must be supplied as long as the vehicle is on the road.

In order to better understand the operational principles of the device according to the invention, a detailed description will be given of the procedures involved in parking, driving-off after parking, and regular travel.

For parking, the car is stopped in the regular way and the ignition is turned off. Then the above-mentioned holding current is cut off by delivering an appropriate signal to the control unit 48, using a personal code in conjunction with either a remote-control device, a magnetic card, a dashboard-mounted alpha-numerical keyboard or any other of the per se known specific-signal producing devices.

Upon receiving the signal, the control unit cuts off the holding current of the solenoid valve 35, as a result of which the plunger 38 and its pad 40 are brought up by the spring 42 against the valve seat 18, cutting off the above-mentioned flow path. Then the brake pedal is depressed, as a consequence of which, pressurized brake fluid reaches the wheel cylinders via two routes: brake fluid, under pressure from the master cylinder slightly opens the check valve 10 and, flowing part the O-ring 24 into the annular space 26 and thence via the ducts 28 into the wheel cylinders, braking the wheels. The other route the brake fluid takes is via the duct 28, the chamber 20 and the duct 22, by forcing open the valve 35. When the brake pedal is now released, pressure from the master cylinder ceases and both the check valve 10 and the plunger 38 instantaneously return to their initial "closed" state, preventing return of the brake fluid from the wheel cylinders to the master cylinder, thus locking the wheels, thereby making it impossible for an unauthorized person to move the vehicle.

The procedure for driving off after parking consists of the activation, by the coded signal, of the solenoid valve 35, which, being energized, retracts the plunger 38 and its pad 40, thus permitting the brake fluid from the wheel cylinders to return to the master cylinder, thereby releasing the locked wheel brakes. As already mentioned, a holding current is supplied during regular travel. In case of an electrical breakdown, combined with a mechanical jamming of the plunger 38, braking is still possible via the above-mentioned check-valve route.

In a variant of the embodiment of FIG. 1, the solenoid valve 35 is a so-called "latch" valve, a type of valve per se known and commercially available. This is a bistable valve in which the plunger 38 can be made to assume either one of two positions, an "open" position and a "closed" position. Switching of positions is effected by changing the polarity of the magnetic field generated by the solenoid coil 36. Depending on the polarity of the field produced by the coil when the control unit 48 receives the appropriate signal, the plunger 38 (which incorporates a permanent magnet) is either drawn into the coil 36 ("open" position) or pushed out of the coil ("closed" position). In either one of these two positions, the plunger 38 is fixedly detained by appropriately placed and polarized permanent magnets, the effects of which are overcome only by another, polarity-reversing electric pulse passed through the coil.

This version has the distinct advantage that, being bistable, it requires no holding current. The plunger 38 has no biasing spring 42, as the force pressing the pad 40 against the seat 18 is supplied by one of the detaining magnets.

A second embodiment of the device according to the invention is illustrated in FIG. 2.

There is seen a lock body 2 with an inlet socket 4 connectable to the master cylinder of the hydraulic braking system and an outlet socket 6 connectable to the wheel cylinders. There is further seen the shaft 52 of a valve 53 rotatably in a bore 55 in the lock body 2. This shaft 52 separates axially aligned ducts 54 and 56, which originate in inlet socket 4 and outlet socket 6, respectively.

On one of its ends, the shaft 52 is fixedly connected to, or integral with, the hub 58 of a gear wheel 60. The other end carries a nut 62 which, via a spring washer 64, pulls the shaft 52 down as far as the hub 58 will permit.

The shaft 52 has two transverse bores, angularly offset with respect to one another by 90°. The first bore, 66, accommodates a check valve 77 comprised of a ball 68 biased against a valve seat 70 by means of a helical spring 72 (see FIG. 3). The other end of the spring 72 abuts against a retaining ring 74.

The second bore, 76, is also shown in FIG. 4 in relation to the ducts 54, 56 (in the "locked" position of the valve).

The shaft 52 is sealed off with respect to the bore 55 by means of a pair of O-rings 78 which prevent pressurized fluid from the master cylinder from leaking through the interface: shaft 52/bore 55.

The function of the check valve 77 was already explained in conjunction with the embodiment of FIG. 1 and need not be gone into again.

Obviously, in order to unlock the brake release lock, communication must be re-established between the outlet socket 6 and the inlet socket 4. This is effected by rotating the valve 53 by 90°, which as is clear from FIGS. 2 and 4, causes the axis of the bore 76 to become parallel to the axes of the ducts 54 and 56 (see FIG. 5), thereby serving as a bridge between the two ducts, thus permitting the brake fluid to return from the wheel cylinders, i.e., release the wheel brakes.

Rotation of the valve 53 is effected by an electric motor 80, the pinion 82 of which meshes with the gear wheel 60. The motor 80, which must rotate the valve 53 first by 90° in one sense (for unlocking the brakes) and then by 90° in the opposite sense (for locking the brakes) is controlled by the control unit 48, signal-operated by the authorized user of the vehicle as explained before. Rotation is limited to 90° in either sense of rotation by a per-se known micro-switch system (not shown).

In the "locked" position of the valve 53, the check valve 77 must be in the position shown in FIG. 2, with the ball 68 facing the inlet socket 4. Pushing down the brake pedal for the purpose of locking the wheel brakes thus causes the pressurized brake fluid to lift the ball 68 against the biasing pressure of the spring 72 and, via duct 56 and outlet socket 6, to reach the wheel cylinders.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A brake release lock for a vehicle interposable between the master cylinder of a hydraulic braking system and the wheel cylinders, said brake release lock comprising:

a first connecting element for connection to said master cylinder;

a second connecting element for connection to said wheel cylinders;

a first passageway connecting said first and said second connecting element, including a valve seat and bore for a check valve spring-biased against said seat and configured in such a way as to prevent fluid to flow from said master cylinder to said wheel cylinders, but to prevent fluid from returning from said wheel cylinders to said master cylinder;

a second passageway connecting said first and said second connecting element, bypassing said check valve, and a rotary valve rotatable by an electric motor between two limit positions for a predetermined angular extent in both senses of rotation and comprising a valve shaft having a first transverse bore accommodating said check valve and a second transverse bore which, depending upon which one of said two limit positions said rotary valve is in, cuts off or re-establishes said second passageway, said first bore and said second bore being angularly offset with respect to one another by a predetermined angle.

2. The brake release lock according to claim 1, wherein the predetermined angle by which said first bore and said second bore are mutually offset with respect to one another is approximately 90°.

3. The brake release lock according to claim 1 further comprising a control unit which, responsive to signals producible by an authorized user of said vehicle, causes said motor to rotate said rotary valve between said two limit positions.

* * * * *